US012626832B2

(12) United States Patent
Schwede et al.

(10) Patent No.: US 12,626,832 B2
(45) Date of Patent: May 12, 2026

(54) ENERGY CONVERTER SYSTEM AND METHOD OF OPERATION

(71) Applicant: Spark Thermionics, Inc., Berkeley, CA (US)

(72) Inventors: Jared William Schwede, Berkeley, CA (US); Felix T. Schmitt, Berkeley, CA (US); Lucas Heinrich Hess, Berkeley, CA (US)

(73) Assignee: Spark Thermionics, Inc., Berkeley, CA (US)

( * ) Notice: Subject to any disclaimer, the term of this patent is extended or adjusted under 35 U.S.C. 154(b) by 0 days.

(21) Appl. No.: 19/217,773

(22) Filed: May 23, 2025

(65) Prior Publication Data

US 2026/0058030 A1 Feb. 26, 2026

Related U.S. Application Data

(60) Provisional application No. 63/651,300, filed on May 23, 2024.

(51) Int. Cl.
*G21H 1/10* (2006.01)

(52) U.S. Cl.
CPC .................................. *G21H 1/106* (2013.01)

(58) Field of Classification Search
CPC ........... G21H 1/106; G21H 1/10; G21H 1/103
See application file for complete search history.

(56) References Cited

U.S. PATENT DOCUMENTS

| | | | | |
|---|---|---|---|---|
| 2,727,167 A * | 12/1955 | Alpert | H01J 9/38 313/553 |
| 3,191,076 A | 6/1965 | Harry et al. | |
| 3,300,660 A | 1/1967 | Jacques | |
| 3,436,566 A | 4/1969 | Langpape et al. | |
| 3,663,840 A | 5/1972 | Rufeh et al. | |
| 3,843,896 A | 10/1974 | Rason et al. | |
| 5,028,835 A | 7/1991 | Fitzpatrick | |
| 6,922,455 B2 * | 7/2005 | Jurczyk | G21B 1/19 376/109 |
| 2003/0152186 A1 * | 8/2003 | Jurczyk | H05H 3/06 376/109 |

FOREIGN PATENT DOCUMENTS

WO 2015173708 A1 11/2015

OTHER PUBLICATIONS

"Alumina Ceramic, Fired or Sintered Ceramic Formed Parts, ADO-85, ADO-90, ADO-96, APO-94, APOLX-94, ADOS-90-R", CoorsTek Safety Data Sheet, date of issue May 15, 2014.

(Continued)

*Primary Examiner* — Terrance L Kenerly
(74) *Attorney, Agent, or Firm* — Jeffrey Schox; Samuel Rosenthal

(57) ABSTRACT

An energy converter system, preferably including one or more thermionic energy converters (TECs), and optionally including an electrical power converter. A TEC, preferably including a collector body, an emitter body, and a seal. A method of operation for an energy converter system, preferably including providing a heat source; converting thermal energy to electrical energy; and/or providing one or more electrical energy outputs.

20 Claims, 5 Drawing Sheets

(56) References Cited

OTHER PUBLICATIONS

Bakken, et al., "Biaxial strength and slow crack growth in porous alumina with silica sintering aid", Journal of the European Ceramic Society, Sep. 5, 2017.

Campbell, et al., "Progress Toward High Power Output in Thermionic Energy Converters", Adv. Sci. 2021, 8, 2003812.

Clémet, et al., "Cesium Consumption in Thermionic Converters", pp. 321-330, 1969.

Hess, et al., "Energy Converter System, Method of Fabrication, and Method of Operation", U.S. Appl. No. 19/217,723, filed May 23, 2025.

Kohl, et al., "Chapter 12—Gas Dehydration and Purification by Adsorption", Gas Purification (Fifth Edition) 1997, pp. 1022-1135.

Paponetti, C.A., "Basics of Brazing", AWS Brazing Handbook, 2007.

Rasor, Neds. , "Thermionic Energy Conversion Plasmas", IEEE Transactions on Plasma Science, vol. 19, No. 6, Dec. 1991.

Schwede, et al., "Energy Converter System and Method of Operation", U.S. Appl. No. 19/217,863, filed May 23, 2025.

Xue, et al., "Low-Temperature Sintering of Alumina with Liquid-Forming Additives", J. Am. Cerom. Soc., Aug. 2011, vol. 74, Issue 8 (1991).

Yates, et al., "Cesium Sorption in Materials for Thermionic Converters", Gulf General Atomic Incorporated, AEC Research and Development Report, GA-8574, C-93b, Advanced Concepts for Future Application—Conversion Devices M-3679 (56 Ed.), prepared under contract AT (04-3)—167, Apr. 8, 1968.

ESPE, et al., "Getter Materials", Electronics 23, pp. 80-86, Oct. 1950.

Zhou, et al., "Theory of field emission from dielectric coated surfaces", Physical Review Research 2, 043439 (2000), http://journals.apa.org/preeacher/pdf/10.1103/PhysRevResearch.2043439.

* cited by examiner

ENERGY CONVERTER SYSTEM AND METHOD OF OPERATION

CROSS-REFERENCE TO RELATED APPLICATIONS

This application claims the benefit of U.S. Provisional Application No. 63/651,300 filed 23 May 2024, which is herein incorporated in its entirety by this reference.

STATEMENT OF GOVERNMENT SUPPORT

This invention was made with government support under Contract No. 80NSSC22CA069 awarded by the National Aeronautics and Space Administration. The government has certain rights in the invention.

TECHNICAL FIELD

This invention relates generally to the energy converter field, and more specifically to a new and useful energy converter system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
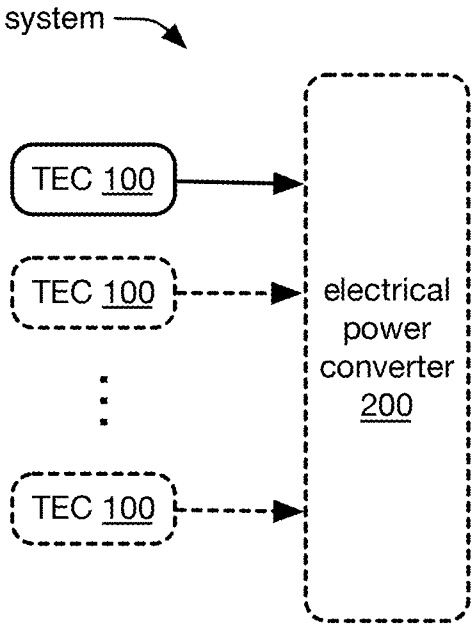
FIG. 1 is a schematic representation of an embodiment of an energy converter system.

An energy converter system preferably includes one or more thermionic energy converters (TECs) 100, and can optionally include an electrical power converter 200 (e.g., as shown in FIG. 1). The TECs preferably function to convert thermal energy to electrical energy. The electrical power converter 200 can function to operate the TECs at or near their optimal power point and/or convert generated electrical power to a desired (e.g., constant voltage) output. However, the system can additionally or alternatively include any other suitable elements and/or be configured in any other suitable manner.

Figure 2:
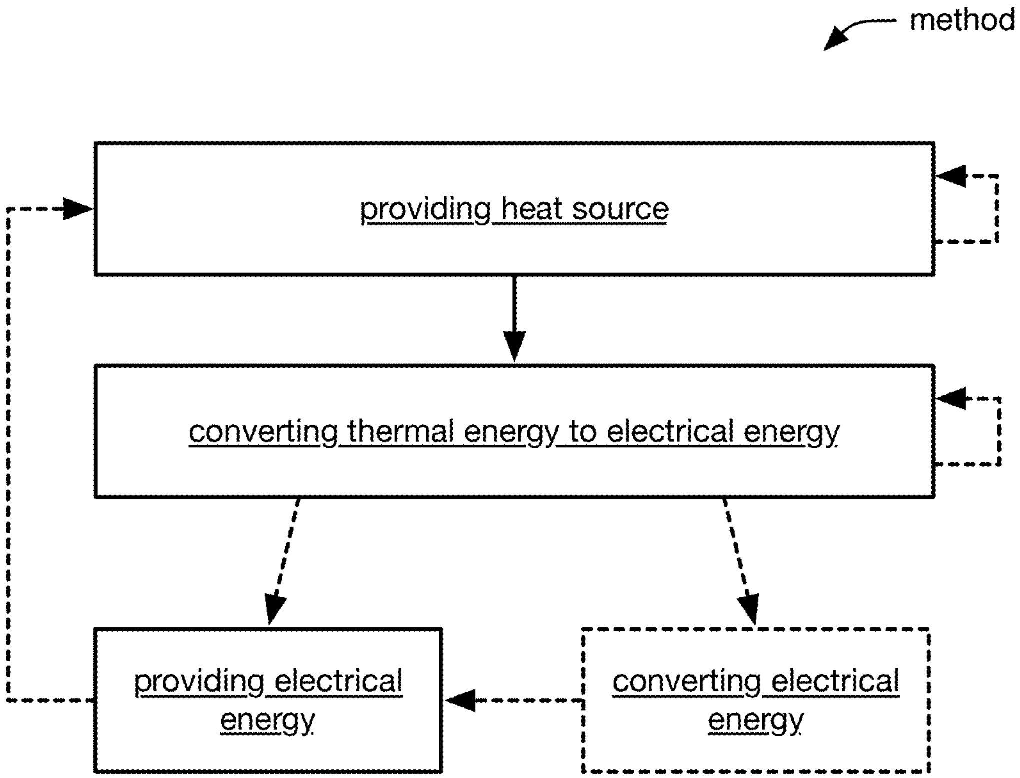
FIG. 2 is a schematic representation of an embodiment of a method of operation for an energy converter system.

A method of operation for an energy converter system (e.g., as shown in FIG. 2) preferably includes providing a heat source (e.g., to an emitter of one or more TECs), such as a waste heat source (e.g., hot airstream surrounding a vehicle, such as heated due to vehicle velocity, combustion, etc.; heat around and/or within a vehicle, such as heat around and/or within a vehicle engine and/or heat generated by the vehicle engine; heat generated by any suitable equipment, such as heat around and/or within the equipment; heat of combustion; etc.) but additionally or alternatively a dedicated heat source (e.g., combustion heat source such as a burner configured to heat the TEC(s), preferably a high-temperature recuperative burner but additionally or alternatively any other suitable combustion heat source); converting thermal energy to electrical energy (e.g., at the TECs, via thermionic emission); and/or providing one or more electrical energy outputs. The method can optionally include converting the electrical energy (e.g., at one or more electrical power converters), such as converting electrical energy provided by one or more TECs to a desired output characteristic (e.g., constant or substantially constant output voltage). However, the method can additionally or alternatively include any other suitable elements performed in any suitable manner.

The method of operation is preferably performed using the energy converter system described herein, but can additionally or alternatively be performed using any other suitable system(s). The energy converter system is preferably operable and/or configured to perform the method of operation described herein, but can additionally or alternatively have any other suitable functionality.

2. System.

2.1 Thermionic Energy Converter.

Each thermionic energy converter (TEC) 100 preferably functions to receive heat and convert the heat to an electrical power output.

Each TEC of the system is preferably a hot shell TEC including a heated emitter body surrounding (e.g., partially surrounding) a collector body. However, the system can additionally or alternatively include one or more button style TECs, inverted design TECs (e.g., as described in U.S. patent application Ser. No. 17/866,381, filed 15 Jul. 2022 and titled "SYSTEM AND METHOD FOR THERMIONIC ENERGY GENERATION", which is herein incorporated in its entirety by this reference, such as described therein regarding the TEC), and/or TECs having any other suitable designs.

The TECs can include plasma-based TECs (e.g., wherein during operation, the vacuum gap between the TEC emitter and collector has an ignited plasma, such as a cesium plasma, which can, in some examples, function to reduce space charge effects associated with the thermionic current traversing the vacuum gap; in examples, this can additionally or alternatively include ionization-based TECs, such as surface ionization or Knudsen TECs, etc.), micro-gap TECs (e.g., wherein the distance between the TEC emitter and collector through vacuum gap is less than a threshold distance, such as less than 100 μm, less than 30 μm, less than 10 μm, less than 3 μm, and/or less than 1 μm, which can, in some examples, function to reduce space charge effects associated with the thermionic current traversing the vacuum gap), and/or any other suitable TECs.

In some examples, one or more of the TECs can include one or more elements such as described in Campbell, M. F., Celenza, T. J., Schmitt, F., Schwede, J. W., & Bargatin, I. (2021). Progress toward high power output in thermionic energy converters. *Advanced Science,* 8 (9), 2003812, which is herein incorporated in its entirety by this reference. However, the system can additionally or alternatively include any other TECs of any suitable design and/or arrangement.

Each TEC is preferably integrated with a heat source (but can additionally or alternatively receive a heat input in any other suitable manner). For example, the TECs can be arranged near and/or protrude into a high-temperature fluid. In a specific example, a plurality of TECs are each arranged at and/or near the surface of a high-velocity vehicle, such as wherein the TECs can harvest heat from an airstream surrounding the vehicle (e.g., airstream heated by traversal of the vehicle through the air). Additionally or alternatively, the TECs can be arranged near and/or otherwise thermally interface with a combustion heat source (e.g., high-temperature recuperating burner), and/or can be integrated with any other suitable heat source(s).

Each TEC preferably defines a chamber (e.g., sealed chamber, such as a hermetically sealed chamber). The chamber is preferably evacuated (e.g., containing little or no atmospheric gases), but can alternatively have any suitable gases and/or other contents. The chamber preferably contains one or more work function reducing materials (e.g., cesium, cesium oxide, other alkali metals and/or oxides, alkaline earth metals and/or oxides, etc.). However, the chamber can additionally or alternatively have any other suitable contents.

The chamber preferably includes a gap region, a reservoir, and/or a conduit. The gap region is preferably arranged between (e.g., defined by, bounded by, etc.) the emitter surface and the collector surface (e.g., wherein the TEC operates via thermionic emission of electrons from the emitter surface, across the gap region, to the collector surface), such as shown by way of examples in FIGS. 4B and/or 4C. The reservoir and conduit are preferably defined by the collector body (e.g., as described below in more detail regarding the collector body). The reservoir is preferably fluidly coupled to the gap region via the conduit, such as shown by way of examples in FIGS. 4B and/or 4C, in which a large pocket (e.g., cylindrical void) in a first face of the collector body (e.g., opposing the collector surface across the collector body) defines the reservoir, a smaller through-hole (e.g., cylindrical through-hole) in the collector body (e.g., from a second face of the collector body, such as a face of the collector sidewall and/or a face of the collector surface, through to the reservoir) defines the conduit, wherein the conduit is defined between two terminals, is open to the reservoir at one of the conduit's terminals, and is open to the gap region at the conduit's opposing terminal, thereby fluidly coupling the reservoir to the gap region. However, the chamber can additionally or alternatively include and/or define any other suitable chamber regions, and/or the regions of the chamber can additionally or alternatively have any other suitable functionality and/or arrangements.

Figure 3:
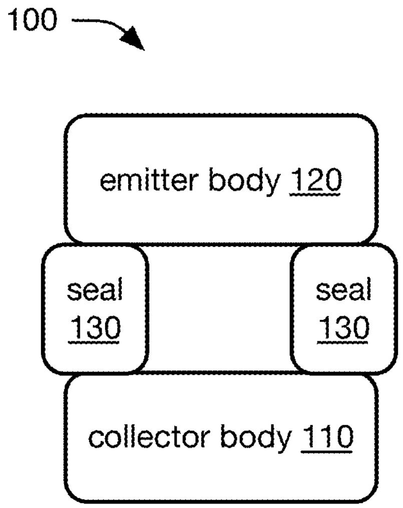
FIG. 3 is a schematic representation of an embodiment of a TEC of the energy converter system.
Figure 4A:
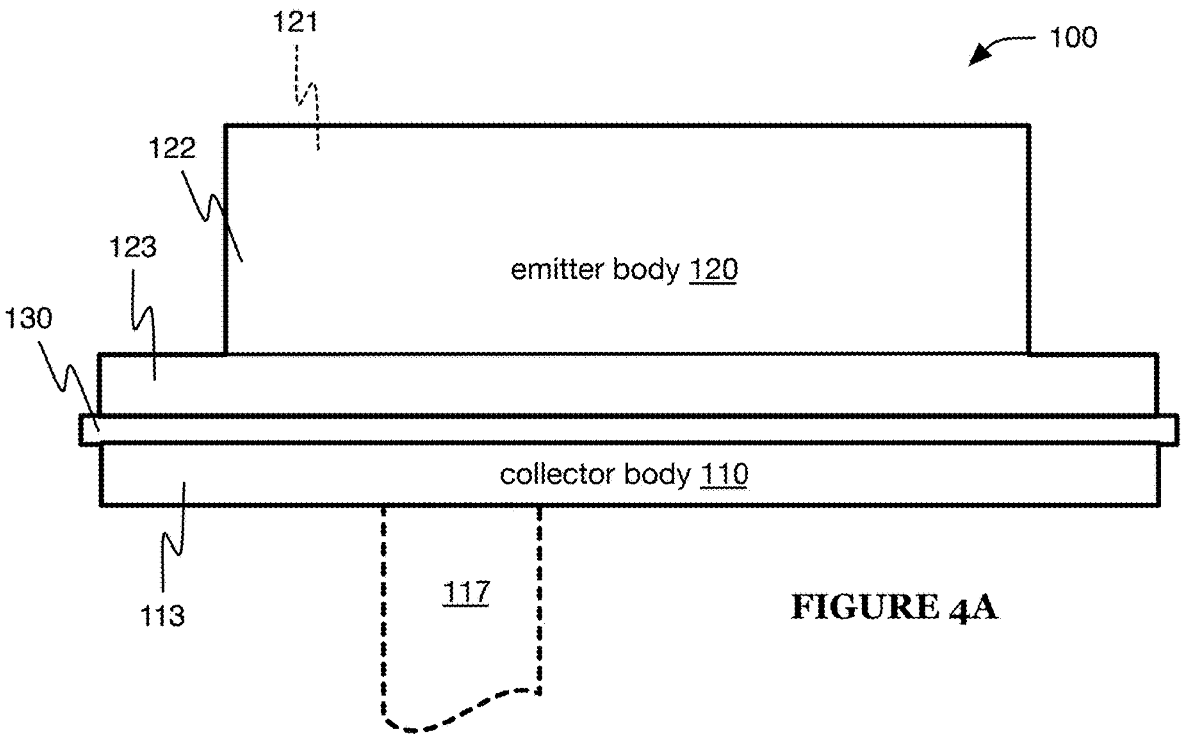
FIGS. 4A-4B are an elevation view and a cross-sectional elevation view, respectively, of an example of the TEC.

The TEC preferably includes a collector body 110, an emitter body 120, and a seal 130 (e.g., as shown by way of examples in FIGS. 3, 4A, and/or 4B).

2.1.1 Emitter Body.

Figure 4B:
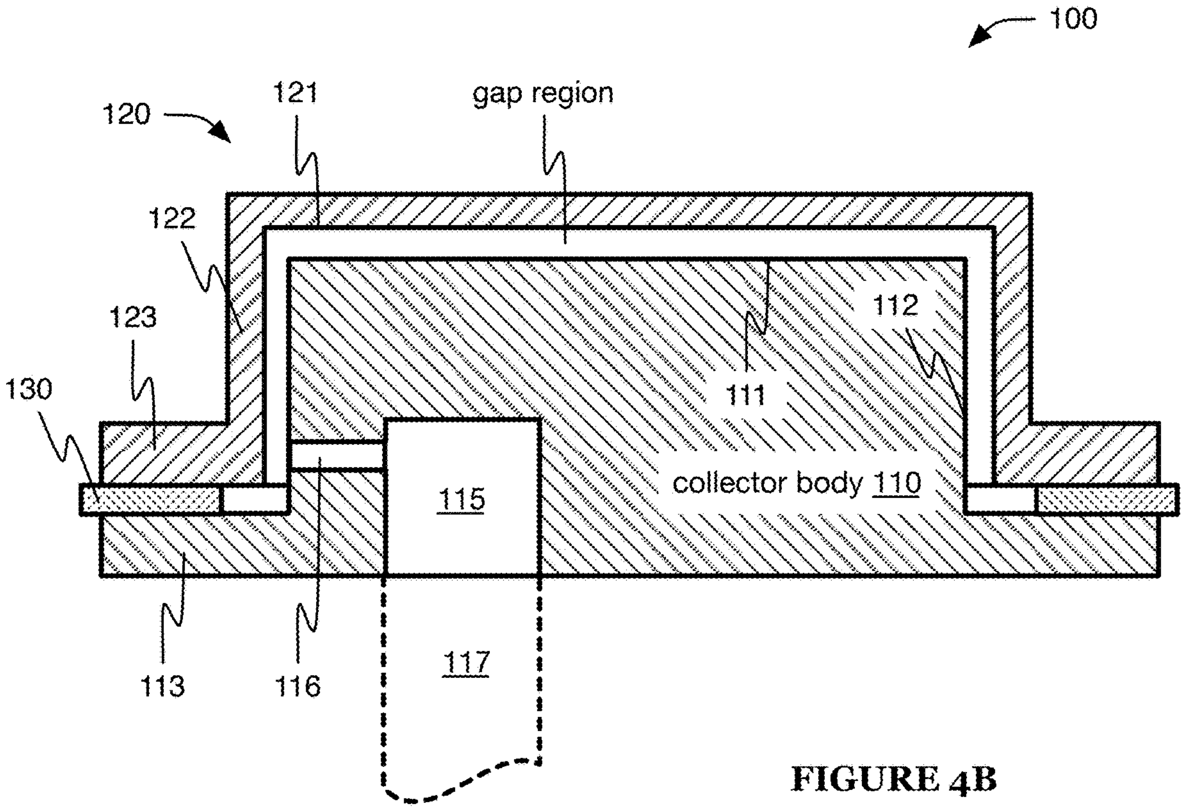
Figure 4C:
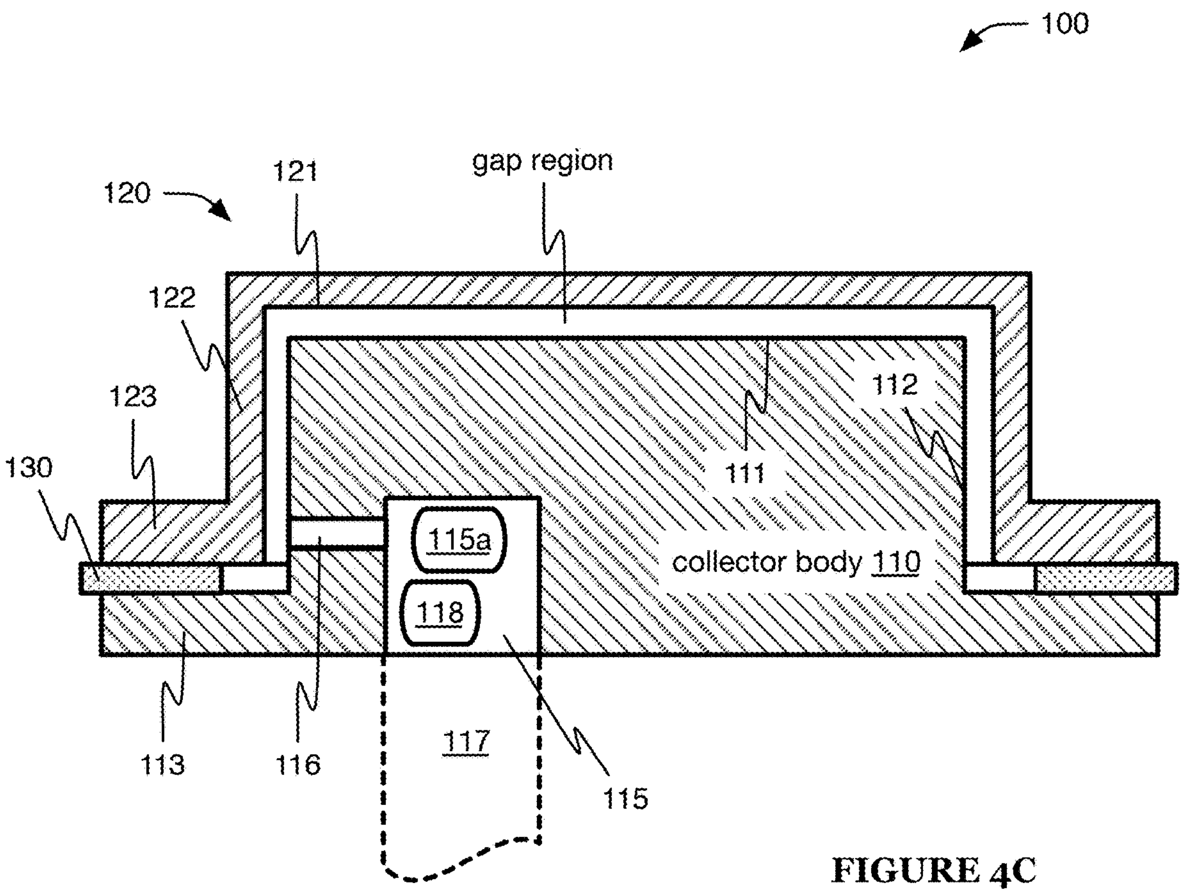
FIG. 4C is a cross-sectional elevation view of a specific example of the TEC.
Figure 5A:
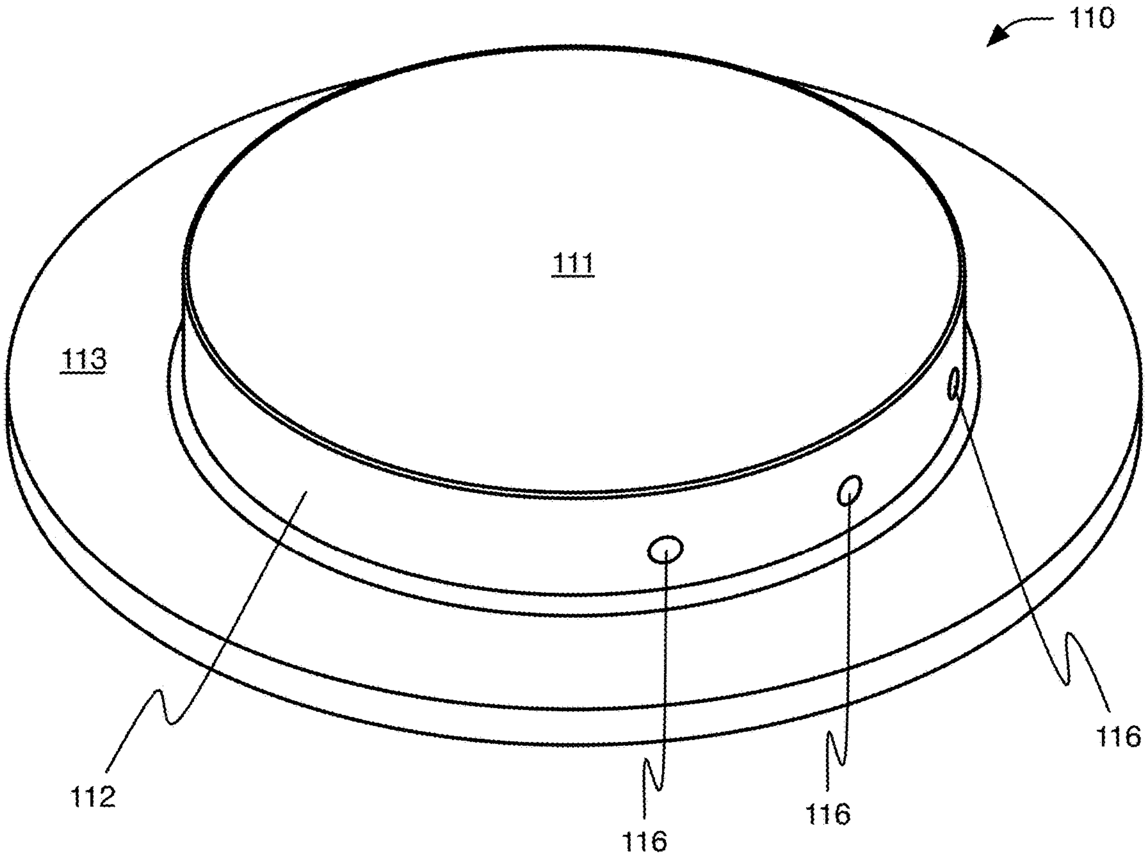
FIGS. 5A-5B are an isometric view and a cross-sectional elevation view, respectively, of a specific example of a collector body of the TEC.
Figure 5B:
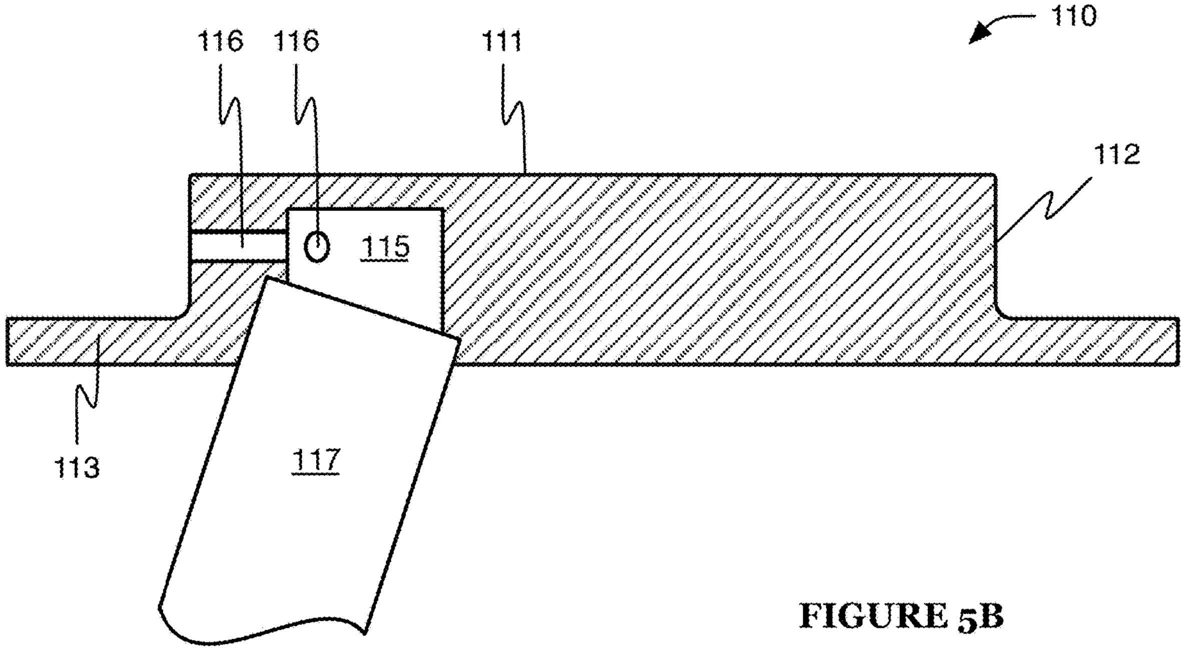
Figure 6A:
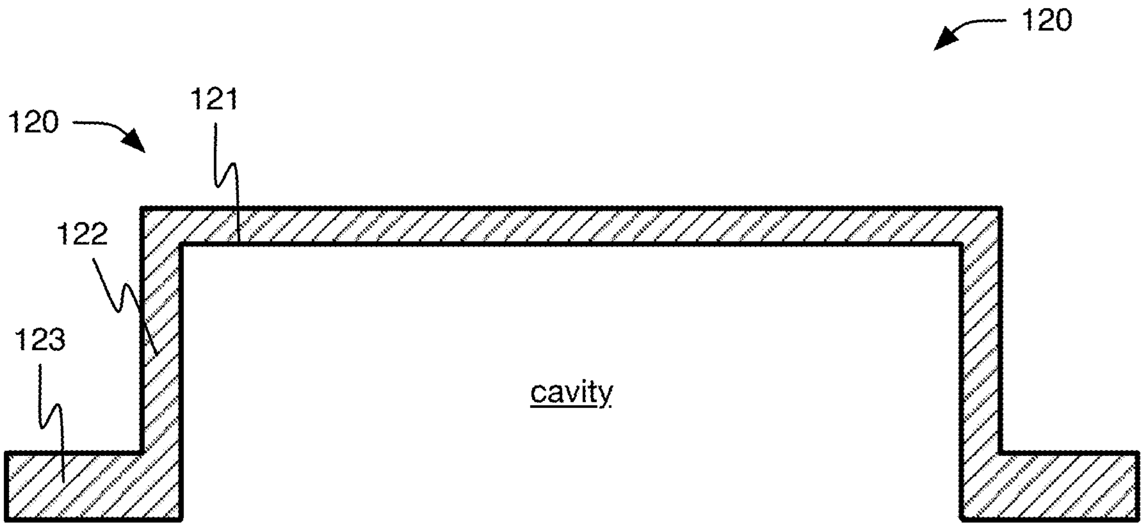
FIGS. 6A-6B are cross-sectional elevation views of an example of an emitter body and a collector body, respectively, of the TEC.
Figure 6B:
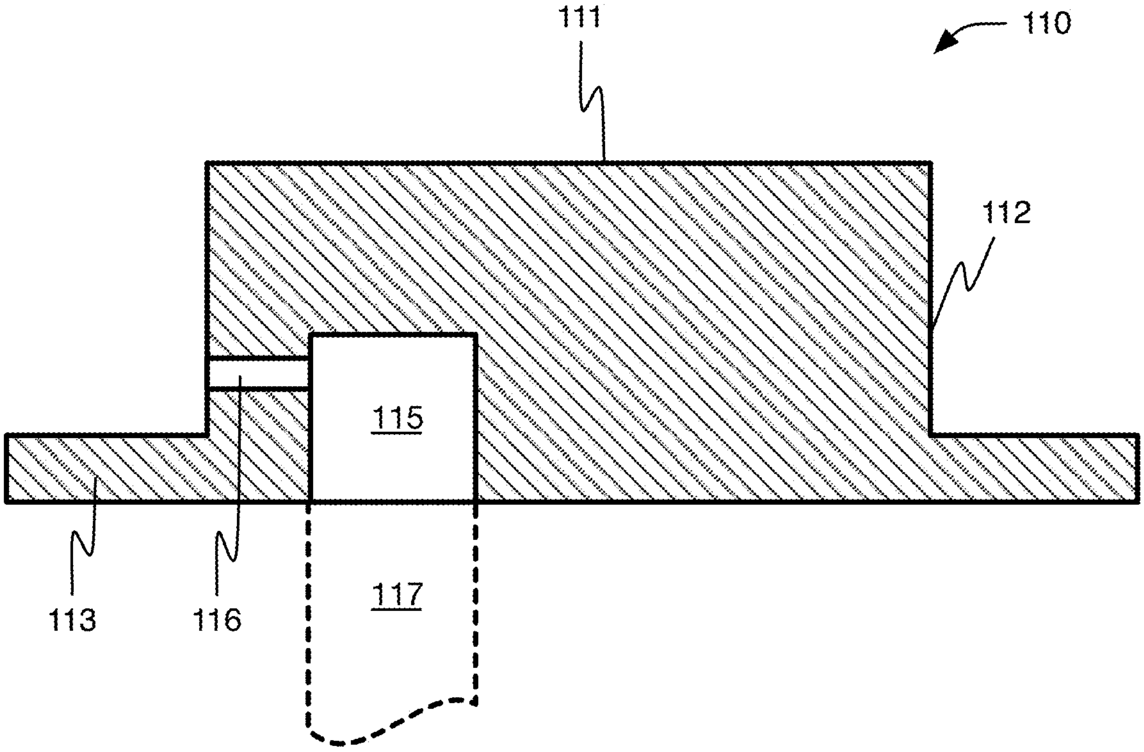

The emitter body 120 preferably defines an emitter surface 121, an emitter sidewall 122, and an emitter base 123 (e.g., as shown by way of examples in FIGS. 4A, 4B, 4C, and/or 6A). The emitter surface 121 and emitter sidewall 122 preferably cooperatively define a cavity.

The emitter surface 121 preferably functions to thermionically emit electrons. The surface can be planar, curved (e.g., dished and/or concave toward the chamber interior; dished away from a body such as away from a vehicle surface; matching or parallel to the contour of a surface such as a vehicle surface; etc.), and/or have any other suitable shape. The emitter surface (and/or any other suitable portion(s) of the emitter body) preferably includes one or more protective coatings on its exterior (opposing the chamber interior across the emitter surface). The protective coatings preferably function to prevent oxidation and/or other degradation of the hot emitter surface (e.g., even at temperatures above 1450° C., such as 1600-2000° C., greater than 2000° C., etc.); one or more additional coatings (e.g., diffusion barrier) may also be present (e.g., between the bulk material and the coating that functions to prevent oxidation and/or other degradation). In a first example, a protective coating can be or includes silicon carbide (e.g., wherein a coating made of, or predominantly of, SiC will typically be effective for temperatures below 1450° C. but could additionally or alternatively function at temperatures above 1450° C., such as 1500-1600, 1600-1750, 1750-2000, and/or greater than 2000° C., etc.), optionally along with one or more additional coatings (e.g., arranged between the silicon carbide layer and the bulk material) such as diffusion barriers. In a second example, a protective coating can include $ZrB_2$ or $HfB_2$ (or alternatively, a mixture thereof) in combination with a smaller amount of SiC (e.g., 10-30% SiC, such as approximately 20% SiC), and optionally, one or more other additives (e.g., metal compounds, preferably refractory metal compounds, which may include silicides, borides, and/or carbides, such as $MoSi_2$, $TaB_2$, WC, $CrB_2$, etc.), optionally along with one or more additional coatings (e.g., arranged between the boride layer and the bulk material) such as diffusion barriers; such coatings may typically be effective for temperatures greater than 1450° C., such as some or all temperatures below 2000° C. In a third example, a protective coating can include one or more platinum-group metals and/or alloys thereof (e.g., bare platinum-group metal; platinum-group metal with an additional layer exterior to it, such as a hafnia coating; etc.), such as hafnia-coated iridium and/or hafnia-coated ruthenium (e.g., for temperatures exceeding 2000° C.), optionally along with one or more additional coatings (e.g., arranged between the platinum-group metal layer and the bulk material) such as diffusion barriers. In a fourth example, a protective coating can include a multilayer coating (e.g., $MoSi_2$/SiC multilayer, $Al_2O_3$/$SiO_2$ multilayer, HfC/SiC multilayer, $ZrO_2$/SiC multilayer, $Si_3N_4$/SiC multilayer, Mullite/$Al_2O_3$ multilayer, etc.; multilayer including three or more different layer compositions, such as compounds from the preceding elements of this list and/or any other suitable compounds, etc.). However, the emitter surface (and/or any other suitable portion(s) of the emitter body) can additionally or alternatively include any other suitable protective coatings (or can alternatively include no such coating).

The emitter sidewall 122 preferably functions to electrically and/or mechanically couple the emitter surface to the emitter base. For example, the emitter sidewall can extend away from a perimeter (e.g., circumference) of the emitter surface toward the emitter base, more preferably wherein the emitter sidewall is connected to the entire perimeter of the emitter surface, but alternatively, wherein the emitter sidewall is connected to the emitter surface in any other suitable manner. The emitter sidewall preferably extends normal or substantially normal to the emitter base (e.g., to a broad surface defined thereon), but can alternatively extend at an oblique angle or any other suitable angle.

The emitter base 123 preferably functions to mechanically couple the emitter body 120 to the collector body 110 (e.g., via the seal 130). The emitter base preferably defines a flat base extending outward from the emitter sidewall. For example, the emitter base can include (e.g., be) a flat disk with a hole defined at the sidewall.

The emitter surface, emitter sidewall, and emitter base can all have the same (or substantially the same) thickness or different thicknesses (e.g., emitter sidewall and/or emitter base can be thinner or thicker than the emitter surface). In some examples, the emitter body is of unitary construction, whereas in other examples, the emitter body (and/or any suitable elements thereof, such as the emitter surface, emitter sidewall, and/or emitter base) can include multiple members that are mechanically and/or electrically connected (e.g., bonded) in any suitable manner.

However, the emitter body can additionally or alternatively include any other suitable elements in any suitable arrangement. Note that, beyond the emitter surface, the emitter body preferably includes a lesser amount of protective coating (e.g., protective coatings such as described above regarding the emitter surface) as compared with the protective coatings on the emitter surface (e.g., as such coatings can be highly thermally conductive, resulting in parasitic heat loss from the emitter surface). In examples, beyond the emitter surface, the protective coatings can have reduced thickness, could omit one or more layers, and/or could have a different composition (e.g., different layers than on the emitter surface). However, the emitter body can alternatively have uniform or substantially uniform protective coatings across its entirety or any suitable subset thereof, can have no or substantially no coatings, and/or can have any other suitable coatings of any composition.

2.1.2 Collector Body.

The collector body 110 is preferably arranged within (e.g., partially within) the cavity defined by the emitter body. The collector body preferably defines a collector surface 111, a collector sidewall 112, a collector base 113, a reservoir 115, and/or a conduit 116, and can optionally define one or more pump ports 117 (e.g., as shown by way of examples in FIGS. 4B, 4C, 5A-5B, and/or 6B).

The collector surface 111 is preferably arranged close to the emitter surface 121. For example, the collector and emitter surfaces can have the same or similar curvature as each other (e.g., wherein the collector and emitter surfaces are planar or substantially planar, preferably in a parallel or substantially parallel arrangement with respect to each other; wherein the collector and emitter surfaces are curved, such as with one nested inside the curvature of the other; etc.), and/or can define a constant or substantially constant gap width (e.g., inter-electrode spacing) between the two of them. In examples, the gap width can be 0.1-10 μm (e.g., 0.5-3 μm, 0.75 μm, 1 μm, 2 μm, etc.), 50-100 nm, less than 50 nm, 10-25 μm, 25-50 μm, 50-100 μm, 100-250 μm, 250-500 μm, 500-1000 μm, 1-2 mm, 2-5 mm, 5-10 mm, or greater than 10 mm. In some examples, for a TEC with no plasma between the electrodes during operation (e.g., “micro-gap TEC”), the gap width is preferably 0.1-10 μm (more preferably 0.5-3 μm), whereas for a plasma-based TEC, the gap width is preferably 25-5000 μm (more preferably 100-3000 μm), or for a surface ionization (e.g., Knudsen) based TEC, the gap width is preferably 0.3-500 μm (more preferably 1-150 μm). However, the TEC can additionally or alternatively define any other suitable gap of any suitable width(s). Additionally or alternatively, the surfaces can define a varying gap width along their surface, the surfaces can be dissimilar from each other, and/or the surfaces can have any other suitable relationship. However, the surfaces can additionally or alternatively have any other suitable characteristics and/or arrangements.

The collector sidewall 112 preferably functions to electrically and mechanically couple the collector surface 111 to the collector base 113. In some examples, the collector sidewall is analogous in shape and/or arrangement within the collector body to the shape and/or arrangement of the emitter sidewall within the emitter body. In other examples, the collector surface and sidewall are surfaces defined by a boss extending away from the collector base (e.g., as shown by way of example in FIG. 4B). For example, the collector sidewall can extend away from the perimeter of the collector surface toward the collector base, preferably being connected to the collector surface around its entire perimeter (e.g., wherein the collector sidewall is the sidewall of a boss extending away from the collector base, and the collector surface is a broad face of the boss opposing the collector base across the boss), but alternatively, to any suitable subset thereof, and/or having any other suitable connectivity to the emitter surface. Further, the collector sidewall preferably extends normal or substantially normal to the collector base, but can alternatively extend at an oblique angle or any other suitable angle. In one example, the emitter sidewall and collector sidewall each define a cylindrical section wherein the two cylindrical sections are substantially coaxial, with the collector sidewall having a smaller radius than the emitter sidewall (e.g., as shown in FIG. 4B). However, the collector sidewall 112 can additionally or alternatively have any other suitable shape, function, and/or arrangement.

In one variation, the collector body includes (e.g., is) a flat disk with a boss extending (e.g., normal to the disk) into the cavity defined by the emitter body (wherein the boss includes the collector sidewall 112 and surface 111, and the disk defines the collector base 113), such as shown by way of example in FIG. 4B.

The collector body preferably defines one or more reservoirs 115. The reservoir 115 is preferably defined within the collector body (e.g., as a cavity within the collector body, such as within the boss defined by the body), such as being defined at and/or near a back surface of the collector body (e.g., opposing the collector surface 111 across the collector body, such as shown by way of examples in FIGS. 4B, 4C, and/or 5B).

In such embodiments (e.g., in which the reservoir is defined within the collector body), the reservoir temperature during TEC operation will typically be similar (e.g., within a threshold temperature difference, such as within less than 10, 20, 40, 50, 75, and/or 100° C., etc.) to the rest of the collector body (e.g., 300-600° C., such as 300-350, 350-400, 400-450, 450-500, 500-550, and/or 550-600° C.; greater than 600° C., such as 600-700, 700-800, 800-900, 900-1000° C., 1000-1200° C., and/or greater than 1200° C.; less than 300° C., such as less than 0, 0-100, 100-200, 200-250, and/or 250-300° C.; etc.); note that, although the reservoir and collector body will typically be at similar temperatures during TEC operation, the emitter body (e.g., emitter surface thereof) will typically be at a significantly higher temperature than the collector body during TEC operation (e.g., at least 100, 125, 150, 175, 200, 225, 250, 275, 300, 350, 400, 450, 500, or 600° C. greater, etc.). This can simplify TEC operation and/or integration with surrounding systems (e.g., heat sources, such as high-velocity vehicles and/or other sources of waste heat), such as due to eliminating the need to control and/or engineer a separate reservoir temperature (e.g., wherein the emitter and collector temperatures are controlled and/or engineered, but the reservoir temperature is closely linked to the collector temperature, rather than being separately controlled and/or engineered). However, this close linking would typically result in reservoir temperatures far greater than those often used in TECs, and accordingly, for a typical TEC reservoir (e.g., liquid cesium reservoir configured to contain liquid cesium and supply cesium vapor to the emitter and/or collector surface), would result in cesium vapor pressures that are far in excess of those desired for efficient TEC operation.

Accordingly, the reservoir 115 preferably contains (and/or is configured to contain) one or more capture materials 115*a*. The capture material(s) 115*a* are preferably operable to store one or more work function modification materials (e.g., operable to reduce the work function of one or more surfaces, such as the cathode work function). The work function modification material(s) preferably include cesium (e.g., wherein the only or substantially only work function modification material used is cesium and/or cesium compounds, such as cesium oxide, cesium hydroxide, etc.), but can additionally or alternatively include any other suitable materials.

The capture material 115*a* is preferably porous, which can enable the capture material to store adsorbed cesium (and/or other work function modification materials). For example, the capture material can have a high Brunauer-Emmett-Teller (BET) ratio, such as a BET ratio greater than a threshold value (e.g., greater than 10, 20, 30, 50, 70, 100, 200, 500, or 1000 $m^2/g$, etc.). Use of such a porous capture material can result in lower cesium vapor pressures at a given reservoir temperature as compared to cesium vapor pressures resulting from a liquid cesium reservoir at the same reservoir temperature (e.g., for reservoir temperatures in the range 350-500° C., use of the capture material-based reservoir can potentially result in cesium vapor pressures that are approximately equal to those that would result from a liquid cesium reservoir at significantly lower temperatures, such as in the range 100-250° C.); note that, due to the high BET ratio of the capture material, the amount of cesium stored in the capture material is typically substantially greater, such as 2-5, 5-10, 10-20, 20-50, or more than 50 times greater, than the cesium, such as vaporized and/or adsorbed cesium, elsewhere in the TEC.

In a first example, the capture material can be of separate construction from the reservoir (e.g., can include one or more pellets and/or other elements placed into, fastened to, and/or otherwise arranged within the reservoir). In a second example, the capture material can be of unitary construction with the reservoir (e.g., can include one or more materials coating some or all of the reservoir, such as the reservoir walls), such as wherein the capture material is deposited on the reservoir wall(s) (e.g., via chemical vapor deposition (CVD), physical vapor deposition (PVD), atomic layer deposition (ALD), electrodeposition, etc.).

In a first embodiment, the capture material can include (e.g., can be) one or more graphitic materials. Graphitic materials can be greatly beneficial in the mitigation of undesired species (e.g., water, hydroxide, hydrogen, etc.) that may be released from the capture material as it is heated (e.g., during and/or leading up to TEC operation); for example, the graphite can act as a source of carbon for combustion, thermal decomposition, and/or other decomposition of some or all of the undesired species (e.g., forming less-deleterious compounds, such as CO and $CH_4$). Because of the huge negative impacts that some or all of these undesired species can have on TEC efficiency and/or longevity, and the large amounts of such undesired species that may be stored in and/or released from a capture material during TEC operation, this aspect of a graphitic capture material can be quite beneficial. However, cesium intercalation into such materials can be complex, resulting in different temperature-vapor pressure curves depending on the amount of cesium loading, the graphite material itself, and/or other factors, and/or can result in swelling of the graphite, which can pose mechanical and/or reliability challenges. In addition, a graphitic capture material may not be compatible with being arranged in close proximity (e.g., within the same reservoir, in a conduit and/or pump port close to the reservoir, close enough that contact between them may occur, in direct line of sight to each other, close enough that graphite from may deposit onto the getter such as during TEC operation, etc.; within a threshold distance, such as within less than 0.1, 0.2, 0.5, 1, 2, 5, 10, 20, 50, 100, or 200 mm, etc.) to one or more getters 118 (e.g., Ti- and/or Zr-containing getters). Accordingly, the use of a graphitic capture material may pose technical challenges and/or unduly restrict TEC engineering (e.g., getter placement).

In a second embodiment, the capture material can exclude (or substantially exclude) graphitic materials and/or carbon-containing materials. In examples, the capture material can include (e.g., can be) silica materials, zeolite materials, porous activated alumina materials (e.g., alumina annealed in a hydrogen environment), and/or any other suitable porous materials (e.g., that do not contain carbon), preferably which can offer a very high surface area for cesium adsorption (e.g., BET ratio greater than 100 $m^2/g$). For example, the activated alumina can be such as described in Kohl, Arthur L., and Richard B. Nielsen. "Gas dehydration and purification by adsorption." Gas Purification (1997): 1022-1135. (e.g., as described on pages 1039-1041 thereof). In one example, the activated alumina is produced by: thermally decomposing aluminum trihydroxide at a temperature in the range of 375-450° C. (e.g., in a hydrogen environment) to release water vapor and form a partially dehydrated aluminum oxide power (e.g., wherein complete dihydroxylation is not allowed to occur during this thermal decomposition, such as wherein the resulting powder still can lose 4-7% of its mass at higher temperatures); bonding the resulting powder (e.g., using water) to form it into the desired size and/or shape; and performing a second thermal treatment (e.g., in a hydrogen environment) of the bonded elements to solidify the bond and re-activate the adsorbent. In some examples, the activated alumina can include one or more commercial products, such as Alcoa H-151, H-152, F-200, and/or F-1; LaRoche A-2, A-201, and/or A-204; Rhone-Poulenc A; Discovery Chemical DD420 and/or DD430; and the like. In a first specific example, the reservoir contains one or more activated alumina pellets. In a second specific example, the reservoir walls are coated with an activated alumina layer. However, in some examples, capture materials such as activated alumina may adsorb large amounts of undesired species, such as water, hydroxide, hydrogen (e . . . g, molecular hydrogen), and/or molecular nitrogen (e.g., adsorbed during exposure to the ambient environment), which could be released during TEC operation (e.g., when the reservoir is heated, such as to operation temperatures). Accordingly, it may be desirable to use one or more getters 118 (e.g., as described below in more detail), which can function to capture these undesired species, abating and/or preventing deleterious effects they may otherwise have on TEC operation.

However, the reservoir 115 can additionally or alternatively include any other suitable elements, and/or be arranged and/or configured in any other suitable manner. Further, the capture material 115*a* can additionally or alternatively be arranged in any other suitable location within the TEC (e.g., any suitable location in which the capture material is fluidly coupled to the gap defined between the emitter and collector surfaces).

The collector body preferably defines one or more conduits 116 (e.g., as shown by way of examples in FIGS. 4B, 4C, and/or 5A-5B). The conduit preferably functions to fluidly couple the reservoir(s) 115 to the gap defined between the emitter and collector surfaces (e.g., thereby enabling the capture material 115*a* to supply the work function modification material(s) to the emitter and/or collector surface via the conduit; thereby enabling evacuation of the gap, such as in some examples in which the pump port is arranged at, near, and/or fluidly coupled to the reservoir; etc.). Additionally or alternatively, the conduit can function to fluidly couple the pump port to this gap (e.g., thereby enabling evacuation of the gap by pumping), such as in some examples in which the pump port is not arranged at, near, and/or fluidly coupled to the reservoir.

In some embodiments, the TEC can define a plurality of conduits (e.g., each independently fluidly coupling the reservoir to the gap region), such as 2, 3, 4, 5, 6-10, 10-20, 20-30, 30-50, 50-100, 100-200, 200-500, 500-1000, 1000-2000, 2000-5000, or more than 5000 conduits. In some such embodiments, a first subset of the plurality of conduits may terminate along the collector sidewall, whereas a second subset of the conduits (e.g., disjoint from the first subset, such as wherein the first and second subsets partition the plurality of conduits) may terminate along the collector surface. In other such embodiments, all conduits of the plurality may terminate along the collector sidewall. In other such embodiments, all conduits of the plurality may terminate along the collector surface. However, the conduits can additionally or alternatively have any other suitable arrangement, connectivity, and/or functionality.

The conduits are preferably straight or substantially straight (e.g., defined by boring a straight hole through the collector body). However, some or all of the conduits can alternatively be curved (e.g., arced, spiraling, boustrophedonic, etc.) and/or have any other suitable configuration, although this may reduce the conduit conductance and, accordingly, the ability of the getters to pump the gap region.

However, the TEC can additionally or alternatively include any other suitable conduits 116 having any suitable arrangement and/or characteristics.

In some examples, the TEC (e.g., the cathode body thereof, but additionally or alternatively the anode body and/or any other suitable elements of the TEC) can include one or more pump ports 117 (e.g., 1, 2, 3, 4, 5, 6-10, 10-20, 20-30, 30-50, 50-100, 100-200, 200-500, 500-1000, 1000-2000, 2000-5000, or more than 5000 pump ports), which can function to fluidly couple the chamber to one or more pumps (e.g., configured to evacuate the chamber, such as pumping the chamber to a low, high, or ultra-high vacuum state).

In a first example, the pump port 117 includes (e.g., is) a tube (e.g., extending outward from the collector base) defining an interior fluidly coupled to the chamber (e.g., via the reservoir 115 and/or conduit 116, such as shown by way of examples in FIGS. 4B, 4C, and/or 5B).

In a second example, the pump port 117 includes (e.g., is) a hole (or other aperture) defined in the collector body. In a first specific example, the pump port is a hole in a portion of the collector base that defines a lid separating the chamber from an external environment and/or a pump (e.g., wherein the one or more pump ports fluidly couple the chamber to the external environment and/or pump, but in the absence of the pump port(s) the lid would otherwise fluidly isolate the chamber from the external environment and/or pump). In a second specific example, the pump port is a hole in a portion of the collector sidewall, collector surface, and/or any other suitable portion of the collector body (e.g., wherein the one or more pump ports fluidly couple the chamber to the external environment and/or pump, such as by opening directly into the gap region, into the reservoir, and/or into one or more conduits). It may be particularly beneficial in this example to include a plurality of pump ports (e.g., 2, 3, 4, 5, 6-10, 10-20, 20-30, 30-50, 50-100, 100-200, 200-500, 500-1000, 1000-2000, 2000-5000, or more than 5000 pump ports), some or all of which may, in some variants, merge (e.g., merging in a downstream pumping direction, such that a plurality of openings into the gap region, reservoir, and/or conduit(s) merge into a single vessel such as a larger-diameter vessel) to define one or more pump manifolds.

However, the TEC can additionally or alternatively include any other suitable pump ports (or can include no such ports).

The pump port is preferably operable to be sealed (e.g., irreversibly sealed, such as wherein the pump port begins in an open state in which the chamber interior is fluidly coupled to the pump, but then is irreversibly transitioned to a closed state in which the chamber is fluidly isolated from the pump, preferably wherein the chamber is hermetically sealed; alternatively, reversibly sealed, such as wherein, after sealing, the pump port is operable to transition back to an open state). For example, during an initial pumping stage, the pump port can fluidly couple the chamber to the one or more pumps; after this initial pumping stage, the pump port can be sealed, thereby fluidly isolating the chamber from the one or more pumps (e.g., and thus hermetically sealing the chamber). In a first example, in which the pump port includes a tube (e.g., metal tube), the tube can be crimped to seal the port. In a second example, in which the pump port defines a hole, the hole can be closed (e.g., via welding, such as laser welding; via brazing; etc.) to seal the port. However, the port can additionally or alternatively be sealed in any other suitable manner. After the pump port is closed, the TEC preferably can be mechanically separated from the one or more pumps (e.g., by cutting or otherwise breaking the pump port beyond the seal, such that a portion of the pump port, including the seal, remains with the TEC while the remainder is separated from the TEC). In some examples (e.g., as shown in FIGS. 4A-4C and/or 5B), the cathode body can include a pump port whose interior is fluidly coupled to the chamber via the reservoir 115 and/or conduit 116. However, the TEC can additionally or alternatively include any other suitable pump port(s) 117, or can include no such ports.

The TEC preferably includes one or more getters 118. The getters are preferably fluidly coupled to the gap defined between the collector and emitter surfaces (e.g., thereby enabling the getters to remove undesired species from the gap and/or prevent undesired species from reaching the gap). The getter(s) can be arranged within the reservoir 115, the conduit 116, the pump port 117, the gap defined between the collector and emitter surfaces, and/or any other suitable location(s).

The getters can include low-temperature getters (e.g., commercially-available getters, such as SAES getters including titanium and/or zirconium, typically with one or more additives), which can function to provide high gettering speeds during initial gettering; non-evaporable getters (e.g., bulk getters, such as bulk getters including titanium and/or zirconium, optionally with one or more additives), which can function to provide sustained gettering (e.g., for longer time periods than the low-temperature getters) due to a significantly higher capacity than the low-temperature getters and/or can function to provide efficient gettering at higher temperatures than the low-temperature getters; and/or any other suitable getters. In one example, the TEC includes both a low-temperature getter and a non-evaporable getter. However, the TEC can additionally or alternatively include any other suitable getters.

In some examples, the getter(s) 118 are arranged in close proximity to the capture material(s) 115*a* (e.g., arranged within the same reservoir 115; arranged close to the reservoir, such as in the conduit 116 and/or pump port 117, preferably in close proximity to the reservoir, such as close to where the conduit and/or pump port intersects the reservoir; etc.), such as shown by way of example in FIG. 4C; such proximity can further facilitate gettering of undesired species released by the capture material (e.g., during pump down, initial heating, and/or sustained operation of the TEC, etc.). In a first specific example, the capture material 115*a* is arranged within the reservoir and the getters are arranged within the pump port (e.g., adjacent to the reservoir). In a second specific example, the capture material 115*a* and the getters are all arranged within the reservoir (e.g., with the getters arranged between the capture material and the conduit 116, which can function to further reduce the undesired species exiting the capture material that reach the gap defined between the emitter and collector surfaces). However, the getter(s) can additionally or alternatively have any other suitable arrangement.

However, the collector body 110 can additionally or alternatively include any other suitable structures having any suitable arrangement and/or functionality.

2.1.3 Seal.

The seal 130 preferably functions: to seal the TEC interior (defined by the emitter body, collector body, and seal), more preferably fluidly decoupling the TEC interior from the surrounding atmosphere (e.g., defining a hermetic seal separating the TEC interior from the surrounding atmosphere, preferably isolating the chamber environment from an ambient environment); to mechanically connect the emitter body to the collector body; and/or to electrically insulate the emitter body from the collector body. In some examples, the seal 130 includes an insulator and one or more braze materials.

The insulator preferably functions (e.g., in cooperation with the braze material) to isolate the system from an external environment proximal the system (e.g., surrounding the system). The insulator (e.g., in cooperation with the braze material) can additionally or alternatively function to dissipate energy from the electron collector, provide mechanical support to the electron collector and/or the system, and/or provide any other suitable function. The insulator is preferably coupled to the collector and emitter. The insulator is preferably arranged between the collector body and emitter body (e.g., between the collector base and the emitter base, such as between an upper side of the collector base and a lower side of the emitter base). For example, the seal can be connected (e.g., mechanically, thermally, etc.) and/or otherwise coupled to the collector and emitter (e.g., the bases thereof) on at least one broad face each of the collector and emitter, preferably connected to a first broad face of the collector base opposing a second broad face of the emitter base (e.g., as shown in FIGS. 3 and/or 4B). More preferably, this coupling and/or connection is achieved via the braze material(s), such as wherein a first portion of braze material is arranged between the insulator and the collector base, preferably connecting the insulator to the collector base, and/or wherein a second portion of braze material, separate from the first portion, is arranged between the insulator and the emitter base, preferably connecting the insulator to the emitter base; note that, in some examples, the seal can include more than one braze material, such as wherein the first portion is or includes a first braze material and the second portion is or includes a second braze material different from the first. However, the insulator can additionally or alternatively be coupled to the collector and/or emitter in any suitable manner.

The insulator (e.g., in cooperation with the braze material, emitter body, and/or collector body) preferably defines a chamber that surrounds the emitter surface and collector surface. The chamber is preferably fluidly isolated from an ambient environment (e.g., atmospheric air) surrounding the system and/or the seal (e.g., wherein a hermetic seal separates the chamber from the ambient environment). The chamber environment is preferably at a reduced pressure (e.g., full or partial vacuum) compared to the ambient environment, but can be at the same pressure and/or an elevated pressure. The chamber can enclose one or more species (e.g., barium, cesium, oxygen, sodium, strontium, zirconium, etc.), such as species that can interact with one or more surfaces (e.g., emitter surface, collector surface, etc.) to modify (e.g., reduce) the work function of the surface(s), to alter the contents of the chamber (e.g., act as a getter, such as by removing one or more undesired species from the chamber), and/or have any other suitable function(s). In some examples, one or more such species can be stored as fill materials (e.g., as described below in further detail), such as wherein the fill material generates a vapor pressure of the species within the chamber. In variants, such as wherein the one or more species are present in a fluid phase (e.g., gas), the pressure (and/or partial pressure) of each species (and/or of all such species together), such as during normal system operation, can be greater than a first threshold pressure (e.g., $1\times10^{-6}$, $2\times10^{-6}$, $5\times10^{-6}$, $1\times10^{-5}$, $2\times10^{-5}$, $5\times10^{-5}$, $1\times10^{-4}$, $2\times10^{-4}$, $5\times10^{-4}$, $1\times10^{-3}$, $2\times10^{-3}$, $5\times10^{-3}$, $1\times10^{-2}$, $2\times10^{-2}$, $5\times10^{-2}$, $1\times10^{-1}$, $2\times10^{-1}$, $5\times10^{-1}$, 1, 2, 5, 10, 20, 50, 100, 200, 500, 760, 800, $10^{-6}$-$10^{-2}$, $10^{-3}$-$10^{-1}$, 0.05-5, 0.75-15, and/or 5-100 Torr, greater than 800 Torr, less than $10^{-6}$ Torr, etc.), less than a second threshold pressure (e.g., $1\times10^{-6}$, $2\times10^{-6}$, $5\times10^{-6}$, $1\times10^{-5}$, $2\times10^{-5}$, $5\times10^{-5}$, $1\times10^{-4}$, $2\times10^{-4}$, $5\times10^{-4}$, $1\times10^{-3}$, $2\times10^{-3}$, $5\times10^{-3}$, $1\times10^{-2}$, $2\times10^{-2}$, $5\times10^{-2}$, $1\times10^{-1}$, $2\times10^{-1}$, $5\times10^{-1}$, 1, 2, 5, 10, 20, 50, 100, 200, 500, 760, 800, $10^{-6}$-$10^{-2}$, $10^{-3}$-$10^{-1}$, 0.05-5, 0.75-15, and/or 5-100 Torr, greater than 800 Torr, less than $10^{-6}$ Torr, etc.), and/or any suitable pressure (or partial pressure). In a specific example, during normal system operation, the system includes a vapor pressure of one or more species present in the fill material (e.g., cesium) between 0.1 and 10 Torr (e.g., 0.2-5, 0.5-2, and/or about 1 Torr, etc.). However, the chamber can additionally or alternatively have any other suitable properties.

The seal preferably functions to mechanically (but preferably not electrically) couple the emitter body to the collector body. The seal can additionally or alternatively function to isolate the chamber environment from an ambient environment (e.g., in cooperation with other portions of the encapsulation).

The seal (e.g., the insulator thereof) preferably includes one or more electrically insulating materials, more preferably materials that can withstand (e.g., without melting, deforming, decomposing, and/or chemically reacting with other species present in the chamber environment, etc.) the seal temperature during TEC operation. The materials are preferably glass and/or ceramic (e.g., bulk ceramic, deposited ceramic, etc.; crystalline and/or amorphous ceramics). For example, the seal can include one or more boride, carbide, oxide, and/or nitride materials and/or any other suitable materials. In specific examples, the seal includes one or more of alumina (e.g., sapphire, amorphous alumina, etc.), aluminum nitride, silica, silicate glass, silicon, silicon carbide, silicon nitride, and/or any other suitable materials. Additionally or alternatively, the seal can include and/or be defined by one or more liquid species, preferably a low vapor pressure liquid (e.g., gallium-based liquid, such as a eutectic mixture of gallium and indium).

In examples in which the seal includes one or more braze materials, the braze material preferably functions to connect the insulator to the collector body and/or emitter body (e.g., forming a hermetic seal, such as described above).

A first portion of the braze material is preferably arranged between the insulator and the emitter body (e.g., a lower broad surface of the emitter base), more preferably mechanically connecting and forming a seal (e.g., hermetic seal) therebetween. A second portion of the braze material is preferably arranged between the insulator and the collector body (e.g., an upper broad surface of the collector base), more preferably mechanically connecting and forming a seal (e.g., hermetic seal) therebetween. The first and second portions of braze material are preferably not connected to each other (e.g., not electrically connected), such as wherein they are separated by the insulator, so as to prevent undesired electrical shorting between the emitter and collector.

However, the seal can additionally or alternatively include any other suitable materials, and/or can include any other suitable structures having any suitable arrangement and/or functionality.

The TEC and/or the system can additionally or alternatively include any other suitable elements in any suitable arrangement and/or having any suitable functionality.

2.2 Electrical Power Converter.

The electrical power converter 200 preferably functions to optimize operation of each TEC of the system and/or convert the output of the one or more TECs to a desired output characteristic (e.g., constant output voltage). In examples, optimizing operation of the TECs can include maintaining their operation at an optimal point on their respective I-V curve, wherein this can include controlling the operation point along the I-V curve to optimize device temperature (e.g., for lower input heat fluxes, tuning to a higher voltage, resulting in an increased emitter temperature; for higher input heat fluxes, tuning to a lower voltage, resulting in decreased emitter temperatures; etc.).

The electrical power converter can include a power optimization module, an electrical power converter, and/or any other suitable elements. For example, the power optimization module can function to drive operation of each TEC to an optimal point on its I-V curve (e.g., for a given input heat flux and/or other operational characteristics), and the electrical power converter can function to convert the TEC outputs to a desired output characteristic.

In one example, the electrical power converter includes a maximum power point (MPP) tracker and a DC-DC converter, and can optionally include one or more additional converters (e.g., second stage converter).

In this example, the MPP tracker preferably functions to maintain operation of each TEC at the optimal point on the I-V curve, more preferably accounting for temperature effects on the TEC efficiency (but alternatively, not accounting for temperature effects such as acting as a simple MPP tracker analogous to a photovoltaic MPP tracker). In this example, the DC-DC converter preferably functions to convert the output electrical power from the TECs to a fixed voltage (e.g., 28 V); in specific examples, the DC-DC converter can be integrated with the MPP tracker or separate from the MPP tracker. The additional converters can function to convert the output of the DC-DC converter into a desired output, such as a higher DC voltage (e.g., a second DC-DC converter that functions to convert the first DC-DC converter's output to a higher DC voltage, optionally, additional DC-DC converters operating sequentially on the output of the preceding converters, etc.).

However, the electrical power converter 200 can additionally or alternatively include any other suitable elements having any suitable arrangement and/or functionality. Further, the system can additionally or alternatively include any other suitable elements having any suitable arrangement and/or functionality.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system comprising a thermionic energy converter (TEC), the TEC defining a chamber comprising:

a gap region defining a gap;

a reservoir; and a conduit, wherein the reservoir is fluidly coupled to the gap region via the conduit;

wherein the TEC comprises:

an emitter body defining a cavity, the emitter body comprising:

a first electrical output;

an emitter surface bounding the cavity and bounding the gap region; and an emitter sidewall electrically and mechanically connected to the emitter surface, the emitter sidewall bounding the cavity, wherein the emitter sidewall electrically couples the emitter surface to the first electrical output;

a collector body comprising a second electrical output and a collector surface arranged within the cavity, wherein:

the collector surface opposes the emitter surface across the gap, wherein the gap is defined within the cavity between the collector surface and the emitter surface; and the collector body defines the reservoir and the conduit;

a seal that mechanically connects the emitter body to the collector body, wherein the seal does not electrically connect the emitter body to the collector body;

a capture material arranged within the reservoir, the capture material comprising porous alumina; and a getter arranged within the chamber.

2. The system of claim 1, wherein:

the chamber is hermetically sealed;

the TEC further comprises cesium adsorbed to the capture material; and the getter pumps at least one undesired species from the chamber.

3. The system of claim 2, wherein the at least one undesired species comprises at least one of: water, hydrogen, hydroxide, or molecular nitrogen.

4. The system of claim 2, wherein:

the collector surface defines a first temperature substantially greater than an ambient temperature;

the emitter surface defines a second temperature substantially greater than the first temperature;

the capture material defines a third temperature similar to the first temperature;

the capture material releases cesium vapor and the at least one undesired species into the chamber, wherein a portion of the cesium vapor reaches the emitter surface; and in response to the portion of the cesium vapor reaching the emitter surface and the emitter surface defining the second temperature, the emitter surface thermionically emits electrons across the gap region to the collector surface.

5. The system of claim 1, wherein the porous alumina defines a Brunauer-Emmett-Teller ratio greater than 30 $m^2/g$.

6. The system of claim 1, wherein the porous alumina defines a Brunauer-Emmett-Teller ratio greater than 100 $m^2/g$.

7. The system of claim 1, wherein the getter comprises titanium and zirconium.

8. The system of claim 7, wherein the getter is a non-evaporable getter.

9. The system of claim 8, wherein the TEC further comprises a low-temperature getter arranged within the chamber, the low-temperature getter comprising titanium and zirconium.

10. The system of claim 1, wherein:

the getter comprises zirconium; and the getter is arranged within the reservoir.

11. The system of claim 1, wherein:

the getter comprises zirconium; and the getter is arranged within less than 20 mm of the capture material.

12. The system of claim 11, wherein the capture material does not comprise graphite.

13. The system of claim 1, wherein the porous alumina comprises activated alumina.

14. The system of claim 1, wherein the capture material is thermally connected to the collector surface via the collector body.

15. A method for thermionic energy conversion, comprising:

at an emitter body of a thermionic energy converter (TEC), receiving a heat input;

in response to receiving the heat input, at the TEC, transferring a first portion of heat from the emitter body to a collector body of the TEC, wherein the first portion of heat increases a reservoir temperature of a reservoir within the collector body, wherein the reservoir comprises porous alumina and cesium adsorbed to the porous alumina;

in response to increasing the reservoir temperature, at the reservoir, desorbing cesium from the porous alumina, wherein a portion of the desorbed cesium migrates to an emitter surface of the emitter body via a chamber comprising the reservoir;

at a getter arranged within the chamber, pumping at least one undesired species from the chamber;

in response to receiving the heat input and in response to the cesium migrating to the emitter surface, at the emitter surface, thermionically emitting electrons into the chamber; and at a collector surface of the collector body, receiving the thermionically emitted electrons.

16. The method of claim 15, wherein, while thermionically emitting electrons at the emitter surface:

the emitter surface defines an emitter temperature;

the collector surface defines a collector temperature;

a difference between the emitter temperature and the collector temperature is at least 200° C.; and a difference between the reservoir temperature and the collector temperature is less than 100° C.

17. The method of claim 16, wherein the difference between the reservoir temperature and the collector temperature is less than 40° C.

18. The method of claim 15, further comprising, in response to increasing the reservoir temperature, concurrent with desorbing cesium from the porous alumina, desorbing the at least one undesired species from the porous alumina, wherein the at least one undesired species comprises at least one of: water, hydrogen, hydroxide, or molecular nitrogen.

19. The method of claim 18, wherein:

the getter comprises zirconium; and the getter is arranged within less than 20 mm of the porous alumina.

20. The method of claim 15, wherein the porous alumina comprises activated alumina defining a Brunauer-Emmett-Teller ratio greater than 50 $m^2/g$.

* * * * *